United States Patent [19]

Hagiwara et al.

[11] Patent Number: 5,191,018
[45] Date of Patent: Mar. 2, 1993

[54] IMPACT-RESISTANT GRAFT COPOLYMER AND THERMOPLASTIC RESIN COMPOSITION CONTAINING SAME

[75] Inventors: Hiroshi Hagiwara; Toshio Hosokawa; Katsumi Suzuki, all of Iwaki, Japan

[73] Assignee: Kureha Kagaku Kogyo Kabushiki Kaisha, Tokyo, Japan

[21] Appl. No.: 795,770

[22] Filed: Nov. 21, 1991

[30] Foreign Application Priority Data

Nov. 30, 1990 [JP] Japan .................. 2-329796

[51] Int. Cl.$^5$ .............................. C08L 9/00
[52] U.S. Cl. ...................... 525/86; 525/64; 525/67; 525/80; 525/84; 525/242; 525/310
[58] Field of Search ............ 525/64, 67, 80, 84, 525/86, 242, 293, 310

[56] References Cited

U.S. PATENT DOCUMENTS 3,953,542  4/1976  Halasa et al. .................. 525/247
4,767,833  8/1988  Yumoto et al. ................. 525/80

FOREIGN PATENT DOCUMENTS

81952/75  12/1976  Australia .
129376  12/1984  European Pat. Off. .
2112002  7/1983  United Kingdom .

*Primary Examiner*—Maurice J. Welsh
*Assistant Examiner*—Rachel Johnson
*Attorney, Agent, or Firm*—Wenderoth, Lind & Ponack

[57] ABSTRACT

A graft copolymer is formed by graft-polymerizing 10-95 wt. parts of a vinyl monomer onto 5-90 wt. parts of the rubber polymer which comprises 40-99 wt. % of butadiene and 1-60 wt. % of an aromatic polycyclic vinyl monomer represented by the following formula (I) or (II):

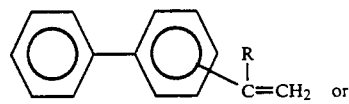

Formula (I)

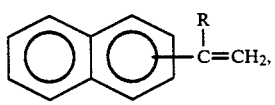

Formula (II)

wherein R denotes a hydrogen atom or a methyl group. The graft copolymer is characterized by the rubber polymer having a high refractive index as well as a low glass transition temperature due to the use of the aromatic polycyclic vinyl monomer. Accordingly, the graft copolymer per se may be used as a thermoplastic resin having good transparency and impact resistance at a low rubber polymer content and may also be added to a transparent thermoplastic resin inclusive of a vinyl chloride resin and a styrene-acrylonitrile copolymer resin to provide the thermoplastic resin with an improved impact resistance while retaining a good transparency.

16 Claims, No Drawings

IMPACT-RESISTANT GRAFT COPOLYMER AND THERMOPLASTIC RESIN COMPOSITION CONTAINING SAME

FIELD OF THE INVENTION AND RELATED ART

The present invention relates to a novel graft copolymer and a thermoplastic resin composition containing the same. More particularly, the present invention relates to a graft copolymer comprising as a trunk component a rubber copolymer of butadiene with a biphenyl derivative or a naphthalene derivative which has a high refractive index and a low glass transition temperature, and also a thermoplastic resin composition containing the graft copolymer.

The graft copolymer according to the present invention may be blended with a various thermoplastic resin including a vinyl chloride-base resin to provide a resin composition having excellent transparency and impact resistance. The graft copolymer per se can constitute a thermoplastic resin excellent in transparency and impact resistance when it has a relatively low content of the rubber polymer.

There have been practically used various thermoplastic resin compositions provided with various performances inclusive of impact resistance by mixing a graft copolymer obtained by graft-polymerizing a rigid resin-forming monomer such as styrene and methyl methacrylate onto a rubber polymer as a trunk component.

In order to enhance the impact resistance-improving effect by blending with a graft copolymer, it is necessary to sufficiently lower the glass transition temperature of the rubber component in the graft copolymer.

Butadiene-styrene copolymer rubber, which has been commercially widely used, results in a lower refractive index if the glass transition temperature is lowered. Thus, if a graft copolymer containing as a trunk component such a rubber having low glass transition temperature and refractive index is blended with a thermoplastic resin, the resulting thermoplastic resin composition is provided with an improved impact resistance but can also have a lowered transparency. Such a difficulty is encountered not only with vinyl chloride resin but also with many other thermoplastic resins.

A butadiene-styrene copolymer rubber can have a higher refractive index by increasing the styrene proportion but is simultaneously caused to have an elevated glass transition temperature to result in a smaller impact resistance-improving effect, thus giving rise to an improper balance of the two properties.

SUMMARY OF THE INVENTION

An object of the present invention is to provide a graft copolymer comprising a vinyl monomer graft-polymerized onto a rubber polymer having a low glass transition temperature and also a high refractive index.

A more specific object of the present invention is to provide a graft copolymer which provides a composition excellent in impact resistance and transparency when blended with a various thermoplastic resin, and also such a thermoplastic resin composition.

Another object of the present invention is to provide a graft copolymer which per se constitute a thermoplastic resin excellent in transparency and impact resistance at a relatively low rubber polymer content.

According to our study, it has been found possible to obtain an objective graft copolymer by using a biphenyl derivative or a naphthalene derivative as a copolymerizing monomer in place of styrene and copolymerizing it with butadiene to form a rubber polymer having a high refractive index and also a low glass transition temperature and by effecting graft copolymerization by using the rubber polymer as a trunk component.

Thus, according to the present invention, there is provided a graft copolymer, comprising: 5–90 wt. parts of a rubber polymer and 10–95 wt. parts of a vinyl monomer graft-polymerized onto the rubber polymer; said rubber polymer comprising 40–99 wt. % of butadiene and 1–60 wt. % of an aromatic polycyclic vinyl monomer represented by the following formula (I) or (II):

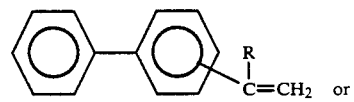

Formula (I)

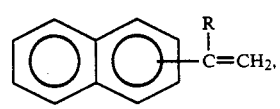

Formula (II)

wherein R denotes a hydrogen atom or a methyl group.

The present invention further provides a thermoplastic resin composition comprising a mixture of the above-mentioned graft copolymer and a thermoplastic resin such as a vinyl chloride resin and styreneacrylonitrile copolymer resin.

The above mentioned and other objects and features of the invention will be better understood upon consideration of the following detailed description concluding with specific examples.

DETAILED DESCRIPTION OF THE INVENTION

The graft copolymer of the present invention will be described in further detail.

Graft Copolymer

Rubber Polymer

The rubber polymer constituting the trunk polymer of the graft copolymer may preferably be a butadiene-based rubber polymer obtained by emulsion polymerization in a known manner of a monomer mixture comprising 40–99 wt. %, preferably 45–90 wt. %, more preferably 50–90 wt. %, of butadiene and 1–60 wt. %, preferably 10–55 wt. %, more preferably 10–50 wt. %, of an aromatic polycyclic vinyl monomer represented by the formula (I) or (II).

Examples of the aromatic polycyclic vinyl monomer represented by the formula (I) or (II) and copolymerized with butadiene may include: vinylbiphenyl compounds, such as 4-isopropenylbiphenyl, 3-isopropenylbiphenyl and 4-vinylbiphenyl; vinylnaphthalene compounds, such as 2-isopropenylnaphthalene and 2-vinylnaphthalene; and alkyl(preferably $C_1$–$C_3$)-substituted derivatives and halogen-substituted derivatives of the above.

If the content of the aromatic polycyclic vinyl monomer is below 1 wt. %, it is impossible to effectively increase the refractive index of the resulting rubber polymer. Such a rubber polymer is not desirable as a trunk polymer because the resulting graft copolymer is caused to have a large difference in refractive index between the trunk polymer and the grafting component in the graft copolymer, thus lacking uniformity of the refractive index of the graft copolymer per se. On the other hand, a proportion exceeding 60 wt. % of the aromatic polycyclic vinyl monomer is not preferred because the resulting rubber polymer is caused to have an elevated glass transition temperature close to room temperature, thus losing rubbery properties.

The rubber polymer having a composition within the above-described range may have a refractive index $n_D$ at 23° C. in the range of 1.52–1.60, preferably 1.53–1.59, and a glass transition temperature in the range of $-70°$ C. to $+10°$ C., preferably $-70°$ C. to $\pm 0°$ C. A refractive index below 1.52 is not substantially different from that of polybutadiene and a refractive index exceeding 1.60 is accompanied with an increase in glass transition temperature. Accordingly, it is desired that the rubber polymer for the graft copolymer of the present invention has a refractive index and a glass transition temperature within the above described ranges.

When the aromatic polycyclic vinyl monomers according to the formulae (I) and (II) are compared with each other, both are excellent in the effect of increasing the refractive index of the rubber polymer while suppressing the increase in glass transition temperature but the one represented by the formula (II) can result in a graft copolymer possibly containing a very slight amount of the non-reacted monomer which can be volatilized to generate an odor when the graft copolymer is dried or heated for processing or molding. On the other hand, in the case of using a monomer represented by the formula (I), no order is generated from the resulting graft copolymer on heating even if a slight amount of the non-reacted monomer remains therein after the polymerization. For this reason, the graft copolymer obtained by using the monomer represented by the formula (I) may be rather preferred as a thermoplastic resin or an ingredient of a thermoplastic resin composition blended with a various thermoplastic resin.

Another vinyl monomer copolymerizable with the aromatic polycyclic vinyl monomer can be used together with the aromatic polycyclic vinyl monomer within an extent not deviating from the object of the present invention. Examples of such another vinyl monomer may include: aromatic vinyl compounds, such as styrene and -methylstyrene; vinyl cyanides, such as acrylonitrile and methacrylonitrile; acrylic acid, methacrylic acid; alkyl acrylates, such as ethyl acrylate, butyl acrylate, and ethylhexyl acrylate; and alkyl methacrylates, such as methyl methacrylate, ethyl methacrylate and butyl methacrylate. In case of using such another vinyl monomer, it is desired to use such another vinyl monomer in an amount of at most 59 wt. %, particularly 1–40 wt. %, of the total amount of the monomers (i.e., butadiene +the aromatic polycyclic vinyl monomer + such another vinyl monomer) so as to replace a portion of the aromatic polycyclic vinyl monomer while retaining the above-mentioned lower limit of the aromatic polycyclic vinyl monomer.

It is also possible to use a polyfunctional monomer copolymerizable with the aromatic polycyclic vinyl monomer and butadiene, as desired, to provide a cross-linked rubber polymer. The polyfunctional monomer may be used in an amount of at most 10 wt. %, preferably 0.1–5 wt. %, of the total monomer amount excluding the polyfunctional monomer. An amount exceeding 10 wt. % is not preferred because the resulting rubber polymer is caused to have an elevated glass transition temperature and a poor elastomeric property, thus lowering the impact resistance-imparting performance of the graft copolymer.

Examples of the polyfunctional monomer may include: aromatic polyfunctional vinyl compounds, such as divinylbenzene and divinyltoluene; di- and tri-methacrylates and di- and tri-acrylates of polyhydric alcohols, such as ethylene glycol dimethacrylate, triethylene glycol dimethacrylate, and 1,3-butanediol diacrylate; and allyl compounds, such as diallyl maleate, diallyl phthalate and allyl methacrylate. The above are not exhaustive and it is generally possible to use a compound having two or more double bonds in its molecule and copolymerizable with the aromatic polycyclic vinyl monomer and also butadiene. It is also possible to use a chain transfer agent in an amount up to 5 wt. % of the total monomer amount so as to adjust the gel content of the resulting rubber polymer. The chain transfer agent may for example be a known one ordinarily used in emulsion polymerization, such as octyl mercaptan, dodecyl mercaptan or lauryl mercaptan.

The rubber polymer latex may ordinarily be prepared to have an average particle size in the range of 50–800 nm.

Too small an average particle size of the rubber polymer latex results in a small impact resistance-imparting effect, and reversely too large an average particle size leads to a lowering in transparency and surface gloss of a molded product from the resulting thermoplastic resin composition. Thus, they are not preferred either.

The average particle size of the rubber polymer latex may be appropriately adjusted into a desired range by controlling the kinds and amounts of the emulsifier and initiator used in emulsion polymerization and the polymerization temperature. Alternatively, it is also possible to prepare a rubber polymer latex having an average particle size of 30–200 nm first and then adding thereto a coagulant to cause agglomeration, thereby providing a desired average particle size. The coagulant may appropriately be an ordinarily used electrolyte including, for example, inorganic acids, such as hydrochloric acid and sulfuric acid; organic acids, such as acetic acid, malic acid and maleic acid; and salts, such as sodium chloride, calcium chloride and magnesium chloride.

Grafting Component

The vinyl monomer graft-polymerized onto the rubber polymer in the present invention may suitably be one providing polymerized units which have a good compatibility with a thermoplastic resin to which the graft copolymer is added so as to easily and uniformly disperse the rubber polymer within the thermoplastic resin and provide a sufficient bonding between the thermoplastic resin phase and the rubber polymer phase.

The grafting monomer component may for example be selected from the following group of monomers so that the graft copolymer according to the present invention may be applicable to not only a single particular thermoplastic resin but also various thermoplastic resins having different refractive indexes.

Thus, the monomer group may include: aromatic vinyl compounds, such as styrene and α-methylstyrene, vinyl cyanides, such as acrylonitrile and methacrylonitrile; acrylic acid, methacrylic acid; alkyl acrylates, such as methyl acrylate, ethyl acrylate and butyl acrylate; alkyl methacrylates, such as methyl methacrylate, ethyl methacrylate and butyl methacrylate; maleimide monomers, such as maleimide and N-phenyl-maleimide; maleic acid, maleic anhydride and their derivatives; and aromatic polycyclic vinyl monomers represented by the above-mentioned formulae (I) and (II). At least one species of the monomers may be used singly or in mixture. These aromatic polycyclic vinyl monomers are also effective as a grafting component to provide a graft copolymer having a high refractive index owing to the grafting component. Particularly, 3-isopropenylbiphenyl may be preferably used. Another copolymerizable monomer may include a polyfunctional monomer identical to those used in the rubber polymer.

Graft Copolymerization

The graft copolymer according to the present invention may be produced by graft-polymerizing 10–95 wt. parts of a vinyl monomer (or mixture) in the presence of 5–90 wt. parts (giving a total of 100 weights parts with the vinyl monomer (mixture)) of a rubber polymer comprising 40–99 wt. % of butadiene and 1–60 wt. % of an aromatic polycyclic vinyl monomer.

More specifically, the vinyl monomer (mixture) may be graft-polymerized in the presence of a rubber polymer latex in an amount of 10–95 wt. parts, preferably 15–50 wt. parts, more preferably 20–40 wt. parts, with respect to 5–90 wt. parts, preferably 50–85 wt. parts, more preferably 60–80 wt. parts, of the rubber polymer. As the graft polymerization is performed at a conversion of substantially 100%, the resultant graft copolymer is provided with substantially the same composition as described above.

If the rubber polymer content is below 5 wt. parts, the graft copolymer lacks in flexibility and rubbery property, thus failing to show an excellent impact resistance. On the other hand, if the rubber polymer content exceeds 90 wt. parts, the graft copolymer is caused to have a low heat resistance and is liable to be in a lump form so that it becomes difficult to uniformly blend the graft copolymer with various thermoplastic resins.

It is particularly preferred that the rubber polymer content is 50–85 wt. parts when the graft copolymer is used as an impact resistance-improver to be blended with another thermoplastic resin.

On the other hand, in order to obtain a graft copolymer which is used as a thermoplastic resin by itself, it is preferred to graft-polymerize 50–95 wt. parts, particularly 60–90 wt. parts, of the vinyl monomer (mixture) onto 5–50 wt. parts, particularly 10–40 wt. parts, of the rubber polymer.

The vinyl monomer (mixture) to be graft-polymerized onto the rubber polymer may be added into the reaction system at one time, separately in several times or continuously for polymerization. In the case where the vinyl monomer (mixture) is added in plural stages for the graft polymerization, the monomer compositions in the respective stages may be the same or different.

It is possible to add a polyfunctional monomer, if desired, to the vinyl monomer (mixture) as mentioned above. The amount may preferably be at most 3 wt. % of the vinyl monomer mixture. Above 3 wt. %, the impact resistance is lowered.

The graft copolymer according to the present invention comprises the above-mentioned rubber polymer as a trunk polymer and a random (co)polymer of the vinyl monomer (mixture) grafted as side branches onto the rubber polymer so as to provide a graft ratio (as defined hereinafter) of 5–55%, preferably 10–45%. A graft ratio of below 5% results in a lower compatibility with a thermoplastic resin and a lower impact resistance-imparting effect. On the other hand, it is difficult to obtain a graft copolymer having a graft ratio exceeding 55% and is thus un-economical.

Utility

According to the present invention, it is possible to obtain a novel graft copolymer comprising as the trunk polymer a rubber polymer having a large refractive index and also a low glass transition temperature. Such a novel graft copolymer is useful as a polymer to be blended with a various thermoplastic resin for imparting an impact resistance without impairing the transparency. The graft copolymer may be particularly advantageously blended with a thermoplastic resin rich in transparency, such as a vinyl chloride resin inclusive of polyvinyl chloride and chlorinated polyvinylchloride, polystyrene, styrene-acrylonitrile copolymer, α-methylstyreneacrylonitrile copolymer, styrene-acrylonitrile-methyl methacrylate copolymer, styrene-methyl methacrylate copolymer, polyester such as polyethylene terephthalate, or polycarbonate.

In order to provide a thermoplastic resin composition with a good transparency, the thermoplastic resin may preferably have a refractive index which is equal to or differs by at most ±0.005 from that of the graft copolymer.

In this case, the graft copolymer according to the present invention may preferably be used in an amount of 2–50 wt. parts with 50–98 wt. parts (giving a total of 100 wt. parts with the graft copolymer) of a thermoplastic resin.

On the other hand, the graft copolymer according to the present invention may be used for various purposes as a thermoplastic resin excellent in transparency as well as in impact resistance by controlling the rubber polymer content therein.

EXAMPLES

Hereinbelow, the present invention will be explained based on Examples and Comparative Examples.

The physical properties described were measured in the following manner.

Refractive Index ($n_D$)

1) Rubber Polymer

A cast film is prepared from a rubber polymer latex, purified by dipping in methyl alcohol and dried under vacuum for 24 hours at room temperature to form a sample film (of about 200 microns in thickness), the refractive index of which is measured at 23° C. by using an Abbe's refractometer.

2) Graft Copolymer

A graft copolymer resin is hot-pressed at 200° C. to form a film (of about 50 microns in thickness), the refractive index of which is measured at 23° C. by using an Abbe's refractometer.

Glass Transition Temperature (Tg)

An about 200 micron-thick hot-pressed film of a graft copolymer was subjected to a viscoelasticity test using a tester ("Rheovibron DDV-II-EA", mfd. by Orientec K.K.) at a frequency of 110 Hz and a temperature-raising rate of 2° C./min to measure temperatures giving maximum peaks appearing in a loss modulus-temperature curve, of which temperatures the lowest one is regarded as the glass transition temperature of the rubber polymer in the graft copolymer.

Average Particle Size in Latex

The average particle size of a rubber polymer or graft copolymer in a latex form is measured by using a submicron particle size analyzer ("Coulter Counter N4", mfd. by Coulter Electronics Co.).

Graft Ratio and Graft Efficiency

"Graft ratio" is defined as a ratio of the amount of a grafting component actually grafted onto a rubber polymer to the amount of the rubber polymer.

"Graft efficiency" is a ratio of the amount of a grafting component actually grafted onto a rubber polymer to the amount of a grafting monomer (mixture) used in the graft polymerization.

A sample graft copolymer is washed with methyl alcohol and dried under vacuum for 24 hours at room temperature, followed by addition of methyl ethyl ketone and 3 hours of stirring at 70° C. Then, the mixture is cooled to 4° C. and then subjected to centrifugation for 1.5 hours under a centrifugal force of 49,000 G to be separated into a methyl ethyl ketone-soluble fraction and a methyl ethyl ketone-insoluble fraction, followed by drying.

Then, the methyl ethyl ketone-insoluble fraction is weighed.

In this way, the methyl ethyl ketone-insoluble fraction weight, the rubber polymer weight and the grafting monomer weight are obtained. From these results, the graft ratio and the graft efficiency are calculated based on the following equations.

Graft ratio (%)=[(methyl ethyl ketone-insoluble fraction weight−rubber polymer weight)/(rubber polymer weight)]×100.

Graft efficiency (%)=[(methyl ethyl ketone-insoluble fraction weight−rubber polymer weight)/(grafting monomer weight)]×100.

Herein, the amount of the monomers used for the rubber polymer polymerization is used as the rubber polymer weight since the polymerization conversion is substantially 100%. Further, the polymerization conversion of the monomer for the graft polymerization is also substantially 100%. (Thus, [graft copolymer weight]≈[rubber polymer weight]+[grafting monomer weight]). A difference between 100% and the graft efficiency corresponds to the methyl ethyl ketone-soluble polymer fraction (i.e., the non-grafted polymer fraction).

Properties of Polyvinyl Chloride Resin Composition

1. Transparency

A sample graft copolymer is blended with other ingredients according to a prescription shown below, and the blend is kneaded for 3 min. on rollers heated at a surface temperature of 180° C. and, after 3 min of preheating in a hot press having a hot plate temperature of 200° C., hot-pressed for 2 min under a load of 150 kg/cm$^2$ to be molded into a 3 mm-thick plate. From the plate, a test piece measuring 50 mm-long and 50 mm-wide is cut out and subjected to measurement of a parallel light transmittance and a haze value according to JIS K7105 (1981).

| (Prescription) | |
|---|---|
| Polyvinyl chloride resin (average degree of polymerization = 700) | 100 wt. part(s) |
| Octyltin-type stabilizer | 2.0 wt. part(s) |
| Higher alcohol lubricant | 0.8 wt. part(s) |
| Higher fatty acid ester lubricant | 0.2 wt. part(s) |
| Polymer processing aid | 1.0 wt. part(s) |
| Graft copolymer | 10 wt. part(s) |

2. Charpy Impact Strength

A 3 mm-thick plate is prepared in the same manner described above for measurement of transparency. In this case, however, in addition to a composition containing 10 wt. parts of a graft copolymer as described above, a composition containing 12. wt. parts of a graft copolymer is prepared in some cases.

From these plate products, V-notched test pieces (No. 5 test specimen according to JIS K7111 (1984)) are cut out.

The measurement is performed at 23° C. and 10° C. according to JIS K7111 (1984).

The results are represented by ordinary Charpy impact strength values as well as a ductile breakage percent given in parentheses as shown in Table 2B hereinafter which is a proportion of broken test piece samples causing a ductile breakage that the test piece is not broken into completely separate two fragments but such two fragments are kept connected while the broken part is stretched.

EXAMPLE 1

A stainless steel-made autoclave equipped with a stirrer was charged with the following composition of materials, followed by nitrogen aeration, gas-evacuation and heating to 80° C.

| | |
|---|---|
| 4-Isopropenylbiphenyl (crystal, Purity 99.5%) | 9.75 wt. part(s) |
| Divinylbenzene (purity 57.2%) | 0.262 wt. part(s) |
| Diisopropylbenzene hydroperoxide (purity 50%) | 0.150 wt. part(s) |
| Sodium pyrophosphate | 0.125 wt. part(s) |
| Disodium ethylenediamine-tetraacetate | 0.00375 wt. part(s) |
| Ferrous sulfate | 0.00225 wt. part(s) |
| Potassium oleate aqueous solution (15.5%) | 2.58 wt. part(s) |
| Deionized water | 200 wt. part(s) |

After the temperature within the autoclave reached 80° C., 65.25 wt. parts of 1,3-butadiene was added to dissolve the 4-isopropenylbiphenyl crystal within the autoclave with the butadiene. Thereafter, 0.6 wt. part of sodium formaldehyde sulfoxylate aqueous solution (5%) was added to initiate emulsion polymerization. After 4 hours from the commencement of polymerization, 2.5 wt. parts of potassium oleate aqueous solution was post-added. During a period after further 1 hour (after 5 hours from the commencement of polymerization), 7.5 wt. parts of t-butyl hydroperoxide aqueous solution (5%) and 7.5 wt. parts of sodium formaldehyde sulfoxylate aqueous solution (5%) were intermittently post-added. The polymerization conversion after 11 hours from the commencement of polymerization was almost 100%. The resultant rubber polymer latex showed an average particle size of 160 nm.

The rubber polymer showed a refractive index $n_D$ at 23° C. of 1.5372.

The thus obtained latex was cooled to 60° C., and the following monomer mixture and polymerization aids were added thereto, followed by 3 hours of graft polymerization at 60° C.

| Methyl methacrylate | 10.5 wt. part(s) |
| --- | --- |
| Butyl acrylate | 2.0 wt. part(s) |
| t-Butyl hydroperoxide aqueous solution (5%) | 3.0 wt. part(s) |
| Sodium formaldehyde sulfoxylate aqueous solution (5%) | 3.0 wt. part(s) |

Then, the following monomer and polymerization aids were added to the system, followed by 4 hours of graft polymerization at 60° C.

| Styrene | 12.5 wt. part(s) |
| --- | --- |
| t-Butyl hydroperoxide aqueous solution (5%) | 4.0 wt. part(s) |
| Sodium formaldehyde sulfoxylate aqueous solution (5%) | 4.0 wt. part(s) |

The resultant graft copolymer latex showed an average particle size of 170 nm.

After adding an antioxidant emulsion, the latex was subjected to acid precipitation with hydrochloric acid aqueous solution, dewatering, washing with water and drying to obtain a graft copolymer in powder form. The rubber polymer in the graft copolymer showed a glass transition temperature of −53° C., and the graft ratio and graft efficiency of the grafting component in the graft copolymer were 31.1% and 93.2%, respectively.

EXAMPLES 2-5

Emulsion polymerization was separately performed in the same manner as in Example 1 except that the amount of 4-isopropenylbiphenyl was changed to 15.0 wt. parts (Example 2), 18.75 wt. parts (Example 3), 22.5 wt. parts (Example 4) and 30.0 wt. parts (Example 5), the amount of 1,3-butadiene was changed to 60.0 wt. parts (Example 2), 56.25 wt. parts (Example 3), 52.5 wt. parts (Example 4) and 45.0 wt. parts (Example 5), and the amount of potassium oleate aqueous solution before the commencement of polymerization was changed to 2.90 wt. parts (Example 2), 3.2 wt. parts (Examples 3 and 4) and 3.0 wt. parts (Example 5), respectively.

The properties of the resultant rubber polymers and graft copolymers are inclusively shown in Table 2A appearing hereinafter.

EXAMPLE 6

A rubber polymer latex was prepared in the same manner as in Example 5, and the following monomer mixture and polymerization aids were added thereto, followed by 5 hours of graft polymerization at 60° C.

| Methyl methacrylate | 6.25 wt. part(s) |
| --- | --- |
| 3-Isopropylbiphenyl | 6.25 wt. part(s) |
| t-Butyl hydroperoxide aqueous solution (5%) | 3.0 wt. part(s) |
| Sodium formaldehyde sulfoxylate aqueous solution (5%) | 3.0 wt. part(s) |

Then, the following mixture was added to the system, followed by 6 hours of graft polymerization at 60° C.

| Methyl methacrylate | 6.25 wt. part(s) |
| --- | --- |
| 3-Isopropenylbiphenyl | 6.25 wt. part(s) |
| t-Butyl hydroperoxide aqueous solution (5%) | 3.0 wt. part(s) |
| Sodium formaldehyde sulfoxylate aqueous solution (5%) | 3.0 wt. part(s) |

The properties of the resultant rubber polymer and graft copolymer are also shown in Table 2A.

EXAMPLE 7

Emulsion polymerization was performed in the same manner as in Example 1 except that the charged amounts of 4-isopropenylbiphenyl, 1,3-butadiene, divinylbenzene and potassium oleate aqueous solution before the commencement of polymerization were changed to 10.5, 64.5, 0 and 3.13 wt. parts, respectively.

The properties of the resultant rubber polymer and graft copolymer are also shown in Table 2A.

EXAMPLE 8

A rubber polymer latex was prepared in the same manner as in Example 1 except that the charged amounts of divinylbenzene and potassium oleate aqueous solution before the commencement of polymerization were changed to 0 and 4.84 wt. parts, respectively, and the emulsion polymerization time was changed to 5 hours.

The polymerization conversion of the monomers was almost 100%, and the resultant rubber polymer latex showed an average particle size of 100 nm.

The latex was cooled to 60° C., and thereafter 7.2 wt. parts of 1%-dialkyl sulfosuccinate aqueous solution and then about 4 wt. parts of 7.5%-acetic acid aqueous solution were added thereto for agglomeration for size-enlargement of rubber particles in the latex to provide an average particle size of 190 nm.

Thereafter, two staged of graft polymerization were performed in the same manner as in Example 1.

The properties of the rubber polymer and resultant graft copolymer are shown in Table 2A.

EXAMPLE 9

A stainless steel-made autoclave equipped with a stirrer was charged with the following composition of materials, followed by nitrogen aeration, gas-evacuation and heating to 80° C.

| 3-Isopropenylbiphenyl (liquid, purity 99.5%) | 10.5 wt. part(s) |
| --- | --- |
| Diisopropylbenzene hydroperoxide (purity 50%) | 0.150 wt. part(s) |
| Sodium pyrophosphate | 0.125 wt. part(s) |
| Disodium ethylenediamine-tetraacetate | 0.00375 wt. part(s) |
| Ferrous sulfate | 0.00225 wt. part(s) |
| Potassium oleate aqueous solution (15.5%) | 2.58 wt. part(s) |
| Deionized water | 200 wt. part(s) |

After the temperature within the autoclave reached 80° C., 64.5 wt. parts of 1,3-butadiene was added to sufficiently mix the 3-isopropenylbiphenyl with the butadiene. Thereafter, 0.6 wt. part of sodium formaldehyde sulfoxylate aqueous solution (5%) was added to initiate emulsion polymerization. After 2 hours from the commencement of polymerization, 2.3 wt. parts of potassium oleate aqueous solution (15.5%) was post-added. During a period after 2.25 hours from the commencement of polymerization, 5.0 wt. parts of t-butyl hydroperoxide aqueous solution (5%) and 5.0 wt. parts of sodium formaldehyde sulfoxylate aqueous solution (5%) were intermittently post-added. The polymerization conversion after 5 hours from the commencement of polymerization was almost 100%.

The thus obtained latex was cooled to 60° C., and two stages of graft polymerization were performed in the same manner as in Example 1.

The properties of the resultant rubber polymer and graft copolymer are also shown in Table 2A.

EXAMPLE 10

A stainless steel-made autoclave equipped with a stirrer was charged with the following composition of materials, followed by nitrogen aeration, gas-evacuation and heating to 80° C.

| | |
|---|---|
| 3-Isopropenylbiphenyl (purity 99.5%) | 11.7 wt. part(s) |
| t-Dodecyl mercaptan | 0.2 wt. part(s) |
| Diisopropylbenzene hydroperoxide (purity 50%) | 0.150 wt. part(s) |
| Sodium pyrophosphate | 0.125 wt. part(s) |
| Disodium ethylenediamine-tetraacetate | 0.00375 wt. part(s) |
| Ferrous sulfate | 0.00225 wt. part(s) |
| Potassium oleate aqueous solution (15.5%) | 0.50 wt. part(s) |
| Deionized water | 200 wt. part(s) |

After the temperature within the autoclave reached 80° C., 53.3 wt. parts of 1,3-butadiene was added to mix the 3-isopropenylbiphenyl within the autoclave with the butadiene. Thereafter, 0.6 wt. part of sodium formaldehyde sulfoxylate aqueous solution (5% was added to initiate emulsion polymerization. After 15 hours from the commencement of polymerization, 2.1 wt. parts of potassium oleate aqueous solution (15.5%) was post-added. During a period after 20 hours from the commencement of polymerization, 1.8 wt. parts of t-butyl hydroperoxide aqueous solution (5%) and 1.8 wt. parts of sodium formaldehyde sulfoxylate aqueous solution (5%) were intermittently post-added. The polymerization conversion after 35 hours from the commencement of polymerization was almost 100%. The resultant latex was cooled to 60° C., and the following monomer mixture and polymerization aids were added thereto, followed by 4 hours of graft polymerization.

| | |
|---|---|
| Methyl methacrylate | 10.5 wt. part(s) |
| Styrene | 5.0 wt. part(s) |
| 3-Isopropenylbiphenyl | 2.0 wt. part(s) |
| t-Butyl hydroperoxide aqueous solution (5%) | 3.0 wt. part(s) |
| Sodium formaldehyde sulfoxylate aqueous solution (5%) | 3.0 wt. part(s) |

Then, the following monomers and polymerization aids were added to the system, followed by 4 hours of a second stage graft polymerization at 60° C.

| | |
|---|---|
| Methyl methacrylate | 10.5 wt. part(s) |
| Styrene | 5.0 wt. part(s) |
| 3-Isopropenylbiphenyl | 2.0 wt. part(s) |
| t-Butyl hydroperoxide aqueous solution (5%) | 3.0 wt. part(s) |
| Sodium formaldehyde sulfoxylate aqueous solution (5%) | 3.0 wt. part(s) |

The properties of the resultant rubber polymer and graft copolymer are also shown in Table 2A.

EXAMPLE 11

Emulsion polymerization was performed in the same manner as in Example 1 except that the 9.75 wt. parts of 4-isopropenylbiphenyl was replaced by 9.75 wt. parts of 2-isopropenylnaphthalene (crystal, purity 99.8%), the amount of potassium oleate aqueous solution was changed to 2.90 wt. parts and the amount of divinylbenzene was changed to zero.

The properties of the resultant rubber polymer and graft copolymer are also shown in Table 2.

EXAMPLE 12

A pressure-resistant glass vessel was charged with the following monomers and polymerization aids and subjected to 12 hours of emulsion polymerization under stirring at 60° C.

| | |
|---|---|
| 1,3-Butadiene | 63.75 wt. part(s) |
| 4-Vinylbiphenyl (crystal, purity 98%) | 11.25 wt. part(s) |
| Divinylbenzene (purity 57.2%) | 0.262 wt. part(s) |
| Diisopropylbenzene hydroperoxide (purity 50%) | 0.25 wt. part(s) |
| Sodium pyrophosphate | 0.10 wt. part(s) |
| Disodium ethylenediamine-tetraacetate | 0.00274 wt. part(s) |
| Ferrous sulfate | 0.00225 wt. part(s) |
| Potassium oleate aqueous solution (15.5%) | 2.0 wt. part(s) |
| Deionized water | 200 wt. part(s) |

The polymerization conversion to the resultant rubber polymer was almost 100%.

To the rubber polymer latex, the following monomers and polymerization aids were added, followed by 2.5 hours of graft polymerization at 60° C.

| | |
|---|---|
| Methyl methacrylate | 10.5 wt. part(s) |
| Butyl acrylate | 2.0 wt. part(s) |
| t-Butyl hydroperoxide aqueous solution (5%) | 2.0 wt. part(s) |
| Sodium formaldehyde sulfoxylate aqueous solutin (5%) | 2.4 wt. part(s) |

Then, the following monomer and polymerization aids were added to the system, followed by 3 hours of graft polymerization at 60° C.

| | |
|---|---|
| Styrene | 12.5 wt. part(s) |
| t-Butyl hydroperoxide aqueous solution (5%) | 3.0 wt. part(s) |
| Sodium formaldehyde sulfoxylate aqueous solution (5%) | 4.0 wt. part(s) |

The properties of the resultant rubber polymer and graft copolymer are also shown in Table 2A.

EXAMPLE 13

A rubber polymer latex was prepared through 20 hours of emulsion polymerization at 60° C. in a similar manner as in Example 12 with the proviso that the 11.25 wt. parts of 4-vinylbiphenyl was replaced by 11.25 wt. parts of 2-vinylnaphthalene (crystal, purity 98%), the amount of diisopropylbenzene hydroperoxide was changed to 0.30 wt. part, the amount of potassium oleate aqueous solution was changed to 4.50 wt. parts, and the other polymerization aids were the same as in Example 12.

The resultant rubber polymer latex was subjected to the same two stages of graft polymerization as in Example 12.

The properties of the resultant rubber polymer and graft copolymer are also shown in Table 2A.

EXAMPLE 14

Emulsion polymerization was performed in the same manner as in Example 1 except that the amounts of the 4-isopropenylbiphenyl, 1,3-butadiene and divinylbenzene were changed to 7.0, 64.0 and 0 wt. part(s), respectively, 4.0 wt. parts of styrene was used anew, and the amount of potassium oleate aqueous solution before the commencement of polymerization was changed to 2.90 wt. parts.

The properties of the resultant rubber polymer and graft copolymer are shown in Table 2A.

EXAMPLE 15

Emulsion polymerization was performed in the same manner as in Example 1 except that the amounts of the 4-isopropenylbiphenyl, 1,3-butadiene and divinylbenzene were changed to 6.5, 62.0 and 0 wt. part(s), respectively, 6.5 wt. parts of 3-isopropenylbiphenyl was used anew, and the amount of potassium oleate aqueous solution before the commencement of polymerization was changed to 2.90 wt. parts.

The properties of the resultant rubber polymer and graft copolymer are shown in Table 2A.

COMPARATIVE EXAMPLE 1

A stainless steel autoclave was charged with the following composition of monomers and polymerization aids including styrene instead of the 4-isopropenylbiphenyl used in Example 1 and subjected to emulsion polymerization at 80° C.

| | |
|---|---|
| 1,3-Butadiene | 56.50 wt. part(s) |
| Styrene | 18.50 wt. part(s) |
| Divinylbenzene (purity 57.2%) | 0.262 wt. part(s) |
| Diisopropylbenzene hydroperoxide (purity 50%) | 0.150 wt. part(s) |
| Sodium pyrophosphate | 0.125 wt. part(s) |
| Disodium ethylenediamine-tetraacetate | 0.00375 wt. part(s) |
| Ferrous sulfate | 0.00225 wt. part(s) |
| Potassium oleate aqueous solution (15.5%) | 0.84 wt. part(s) |
| Deionized water | 180 wt. part(s) |

After 4 hours from the commencement of polymerization, 4.8 wt. parts of potassium oleate aqueous solution (15.5%) was added. During a period after 5 hours from the commencement of polymerization, 1.0 wt. parts of t-butyl hydroperoxide aqueous solution (5%) and 1.0 wt. parts of sodium formaldehyde sulfoxylate aqueous solution (5%) were intermittently post-added. The polymerization conversion after 8 hours from the commencement of polymerization was almost 100%.

The resultant butadiene-styrene copolymer latex was cooled to 60° C. and then subjected to two-stages of graft polymerization by using the same compositions of monomers and polymerization aids as used in Example 1.

The properties of the resultant rubber polymer and graft copolymer are also shown in Table 2A.

COMPARATIVE EXAMPLES 2-4

Emulsion polymerization was started at 60° C. in the same manner as in Example 1 except that the amount of 1,3-butadiene and styrene was changed to 57.75 and 17.25 wt. parts (Comparative Example 2), 45.0 and 30.0 wt. parts (Comparative Example 3) and 37.5 and 37.5 wt. parts (Comparative Example 4), respectively.

After 3 hours from the commencement of polymerization, 3.8 wt. parts of potassium oleate aqueous solution (15.5%) was post-added. From 4 hours after the commencement of polymerization, 1.0 wt. part of t-butyl hydroperoxide aqueous solution (5%) and 1.0 wt. part of sodium formaldehyde sulfoxylate aqueous solution (5%) were added intermittently. The polymerization conversion after 7 hours from the commencement of polymerization was almost 100%.

Each of the three types of rubber polymer latexes was subjected to two stages of graft polymerization in the same manner as in Example 1.

The properties of the resultant rubber polymers and graft copolymers are also shown in Table 2A.

COMPARATIVE EXAMPLE 5

Emulsion polymerization for preparing a graft copolymer was performed in the same manner as in Example 10 except that the amount of 3-butadiene was changed to 49.4 wt. parts and the 1,3-isopropenylbiphenyl was replaced by 15.6 wt. parts of styrene.

The properties of the resultant rubber polymer and graft copolymer are also shown in Table 2A.

Further, the compositions of the graft copolymers prepared in the above Examples and Comparative Examples are inclusively shown in Table 1.

Further, among the graft copolymers thus prepared, some graft copolymers having a refractive index close to that of polyvinylchloride resin were respectively mixed with polyvinyl chloride to obtain polyvinyl chloride resin compositions, and the properties (Charpy impact strengths and transparencies) of the resultant compositions were measured in the above-described manner. The results are shown in Table 2B.

Evaluation

The refractive indexes and glass transition temperatures of rubber polymers obtained by copolymerizing 4-isopropenylbiphenyl or styrene with 1,3-butadiene are shown at Examples 1-5 and Comparative Examples 1-4 in Table 2A. In view of these data in comparison, it is clear that the rubber polymers obtained by using 4-isopropenylbiphenyl as a comonomer (Examples 1-5) provided lower glass transition temperatures than those of butadiene-styrene copolymer rubbers (Comparative Examples 1-4) at comparable refractive index levels.

It is also clear that the rubber polymers comprising copolymers of 3-isopropenylbiphenyl (Examples 9 and 10), 2-isopropenylnaphthalene (Example 11), 4-vinylbiphenyl (Example 12) and 2-vinylnaphthalene (Example 13), respectively, with 1,3-butadiene also provided lower glass transition temperatures than those of butadiene-styrene copolymer rubbers at comparable refractive index levels.

In view of Examples 5 and 6 using an identical rubber polymer comprising a 1,3-butadiene/4-isopropenylbiphenyl copolymer in comparison, the graft copolymer obtained by using 3-isopropenylbiphenyl as a grafting component (Example 6) provided a higher refractive index and unexpectedly a lower glass transition temperature of the rubber polymer portion than the graft copolymer obtained without using such an aromatic polycyclic vinyl monomer.

In this way, if the monomer represented by the formula (I) or (II) is used in both the rubber component and grafting component, it is possible to effectively increase the refractive index compared with the increase in glass transition temperature of the rubber polymer.

Further, in view of Example 10 and Comparative Example 5 using grafting components of the same composition including 3-isopropenylbiphenyl, it is clear that the graft copolymer obtained by using 3-isopropenylbiphenyl also in the rubber polymer (Example 10) provided a lower glass transition temperature of the rubber polymer and also higher refractive indexes of the rubber polymer and graft copolymer than the graft copolymer obtained by using styrene instead thereof (Comparative Example 5).

EXAMPLE 16

A rubber polymer latex was prepared in the same manner as in Example 8 except that the charged amount of potassium oleate aqueous solution before the commencement of polymerization was changed to 4.0 wt. parts.

The polymerization conversion of the monomers was almost 100%, and the average particle size of the rubber polymer latex was 110 nm.

The resultant rubber polymer latex was cooled to 60° C., and the following mixture was added thereto, followed by 6 hours of emulsion polymerization at 60° C.

| | |
|---|---|
| Methyl methacrylate | 12.5 wt. part(s) |
| Styrene | 12.5 wt. part(s) |
| t-Butyl hydroperoxide aqueous solution (5%) | 4.0 wt. part(s) |
| Sodium formaldehyde sulfoxylate aqueous solution (5%) | 4.0 wt. part(s) |

After 3 hours from the commencement of the graft polymerization, the following aqueous solutions were post-added.

| | |
|---|---|
| t-Butyl hydroperoxide aqueous solution (5%) | 4.0 wt. part(s) |
| Sodium formaldehyde sulfoxylate aqueous solution (5%) | 4.0 wt. part(s) |

The compositions and properties of the resultant rubber polymer and graft copolymer are shown in Tables 3 and 4, respectively, appearing hereinafter.

EXAMPLE 17

A rubber polymer latex was prepared by emulsion polymerization in the same manner as in Example 16.

The resultant rubber polymer latex was cooled to 60° C., and the following mixture of monomers and polymerization aids was added thereto, followed by 4.5 hours of graft polymerization at 60° C.

| | |
|---|---|
| Acrylonitrile | 5.0 wt. part(s) |
| Styrene | 7.5 wt. part(s) |
| t-Butylhydroperoxide aqueous solution (5%) | 3.0 wt. part(s) |
| Sodium formaldehyde sulfoxylate aqueous solution (5%) | 3.0 wt. part(s) |

Subsequently, the following monomer mixture and polymerization aids were added to the system, followed by 6 hours of second-stage graft polymerization.

| | |
|---|---|
| Acrylonitrile | 5.0 wt. part(s) |
| Styrene | 7.5 wt. part(s) |
| t-Butylhydroperoxide aqueous solution (5%) | 3.0 wt. part(s) |
| Sodium formaldehyde sulfoxylate aqueous solution (5%) | 3.0 wt. part(s) |

The compositions and properties of the resultant rubber polymer and graft copolymer are also shown in Tables 3 and 4.

EXAMPLE 18

A rubber polymer latex was prepared by emulsion polymerization in the same manner as in Example 16 except that the amounts of 4-isopropenylbiphenyl, 1,3-butadiene and potassium oleate aqueous solution added before polymerization were changed to 10.4 wt. parts, 69.6 wt. parts and 4.3 wt. parts, respectively.

The resultant rubber polymer latex was cooled to 60° C., and the following mixture was added thereto, followed by 7.5 hours of graft polymerization at 60° C.

| | |
|---|---|
| Acrylonitrile | 8.0 wt. part(s) |
| Styrene | 12.0 wt. part(s) |
| t-Butyl hydroperoxide aqueous solution (5%) | 3.0 wt. part(s) |
| Sodium formaldehyde sulfoxylate aqueous solution (5%) | 3.0 wt. part(s) |

After 3 hours from the commencement of the graft polymerization, the following aqueous solutions were post-added.

| | |
|---|---|
| t-Butyl hydroperoxide aqueous solution (5%) | 4.0 wt. part(s) |
| Sodium formaldehyde sulfoxylate aqueous solution (5%) | 4.0 wt. part(s) |

The compositions and properties of the resultant rubber polymer and graft copolymer are also shown in Tables 3 and 4.

From the results of Examples 16-18 shown in Tables 3 and 4, the characteristics of the graft copolymer according to the present invention that the rubber polymer and the graft copolymer are provided with a high refractive index while retaining a low glass transition temperature of the rubber polymer, explained with reference to Examples 1-15, were commonly attained with respect to a one-stage graft copolymer (Example 16), a two-stage graft copolymer containing acrylonitrile in the grafting components (Example 17) and a one-stage graft copolymer containing acrylonitrile in the grafting component (Example 18).

EXAMPLE 19

A rubber polymer latex was prepared by emulsion polymerization in the same manner as in Example 9 except that the charged amounts of 3-isopropenylbiphenyl, 1,3-butadiene and potassium oleate aqueous solution added before polymerization were changed to 26.25 wt. parts, 48.75 wt. parts and 0.93 wt. parts, respectively. The resultant rubber polymer latex showed an average particle size of 210 nm.

The rubber polymer latex was cooled, weighed in 77.5 wt. parts so as to provide 20 wt. parts of the rubber content, and then charged into a stainless steel-made autoclave equipped with a stirrer together with the following mixture, followed by aeration with nitrogen and heating to 60° C.

| Deionized water | 140 wt. part(s) |
| --- | --- |
| Diisopropylbenzene hydroperoxide (purity 50%) | 0.15 wt. part(s) |
| Sodium pyrophosphate | 0.08 wt. part(s) |
| Disodium ethylenediamine-tetraacetate | 0.003 wt. part(s) |
| Ferrous sulfate | 0.0018 wt. part(s) |
| Potassium oleate aqueous solution (15.5%) | 3.2 wt. part(s) |

After the temperature within the autoclave reached 60° C., 23 wt. parts of acrylonitrile and 57 wt. parts of styrene were added, and then 0.6 wt. part of sodium formaldehyde sulfoxylate aqueous solution (5%) was added to start graft polymerization. From 9 hours after the commencement of the graft polymerization, the following aqueous solution was post-added intermittently.

| t-Butyl hydroperoxide aqueous solution (5%) | 4.0 wt. part(s) |
| --- | --- |
| Sodium formaldehyde sulfoxylate aqueous solution (5%) | 4.0 wt. part(s) |

An antioxidant emulsion was added to the latex after 12 hours of the graft polymerization, followed by acid precipitation with hydrochloric acid aqueous solution, de-watering, washing with water and drying to obtain a powdery graft copolymer.

The thus-prepared powdery graft copolymer having a rubber content of 20 wt. % was kneaded for 3 min. on rollers having a surface temperature of 175° C. The resultant milled sheet was preheated for 2 min. and then molded under a load of 150 kg/cm² for 1 min. by means of a hot press having a hot plate temperature of 200° C. to be molded into a 2 mm-thick plate product. A test piece measuring 50 mm-long and 50 mm-wide was cut out from the plate product and subjected to measurement of a parallel light transmittance and a haze value similarly as in the case of a polyvinyl chloride resin composition.

Further, a No. 5 test specimen (with a V-notch) according to JIS K-7111 (1984) was cut out from the 2 mm-thick plate product and subjected to a Charpy impact test at 23° C. Further, a No. 1 E.D test specimen (without a V-notch) was similarly cut out and subjected to a Charpy impact test at 0° C.

COMPARATIVE EXAMPLE 6

A rubber polymer latex was prepared same manner as in Comparative Example 1 except that the charged amounts of 1,3-butadiene, styrene, divinylbenzene, de-ionized water and potassium oleate aqueous solution added before polymerization were changed to 33.75 wt. parts, 41.25 wt. parts, 0 wt. part, 200 wt. parts, and 0.81 wt. part, respectively. The resultant rubber polymer latex showed an average particle size of 200 nm.

The resultant rubber polymer latex was cooled, weighed in 77.5 wt. parts so as to provide 20 wt. parts of the rubber content and then subjected to graft copolymerization in the same manner as in Example 19 to provide a graft copolymer latex containing 20 wt. parts of the rubber content. The latex was treated in the same manner as in Example 19 to obtain a powdery graft copolymer.

The compositions of the rubber polymers and graft copolymers prepared in Example 19 and Comparative Example 6 are shown in Table 3, and the properties thereof and of molded samples from the graft copolymers are shown in Table 4.

Evaluation

From the comparison of Example 19 and Comparison Example 6, it is clear that the rubber polymer containing 3-isopropenylbiphenyl according to the present invention (Example 19) showed a remarkably lower glass transition temperature than the butadienestyrene copolymer (Comparative Example 6) at an identical refractive index level. Further, the graft copolymer obtained in Comparative Example 6 was very brittle at a low temperature, whereas the graft copolymer obtained in Example 19 showed an excellent impact resistance even at a low temperature.

EXAMPLE 20

A stainless steel-made autoclave equipped with a stirrer was charged with the following composition of starting materials, followed by closing, nitrogen-aeration and evacuation.

| 3-Isopropenylbiphenyl | 28.0 wt. part(s) |
| --- | --- |
| t-Dodecyl mercaptan | 0.14 wt. part(s) |
| Diisopropylbenzene hydroperoxide (50%) | 0.21 wt. part(s) |
| Sodium pyrophosphate | 0.125 wt. part(s) |
| Disodium ethylenediamine-tetraacetate | 0.00375 wt. part(s) |
| Ferrous sulfate | 0.00225 wt. part(s) |
| Sodium formaldehyde sulfoxylate | 0.03 wt. part(s) |
| Sodium dodecyl-diphenyl-ether-disulfonate aqueous solution (50%) | 0.13 wt. part(s) |
| De-ionized water | 200 wt. part(s) |

Then, 42.0 wt. parts of 1,3-butadiene was supplied, and the autoclave was externally heated to 80° C. to start emulsion polymerization.

From 3 hours after the commencement of polymerization, 1.2 wt. parts of t-butyl hydroperoxide aqueous solution (5%) and 1.2 wt. parts of sodium formaldehyde sulfoxylate aqueous solution (5%) were post-added intermittently in 15 hours. Further, at 7 hours after the commencement of polymerization, 1.0 wt. part of sodium dodecyl-diphenyl-ether-disulfonate aqueous solution (50%) was added so as to retain the stability of emulsion polymer particles within the autoclave.

After 18 hours of reaction, the pressure within the autoclave was lowered to the atmospheric pressure by venting, and then the latex within the autoclave was cooled to 60° C.

The resultant rubber polymer showed an average particle size of 200 nm in its latex form and showed a refractive index $n_D$ at 23° C. of 1.568.

To the rubber polymer thus obtained, the following monomers and polymerization aids were added to effect 2.5 hours of graft polymerization at 60° C.

| | |
|---|---|
| Styrene | 11.25 wt. part(s) |
| Acrylonitrile | 3.75 wt. part(s) |
| t-Butyl hydroperoxide aqueous solution (5%) | 1.0 wt. part(s) |
| Sodium formaldehyde sulfoxylate aqueous solution (5%) | 1.0 wt. part(s) |

Incidentally, the t-butyl hydroperoxide aqueous solution and sodium formaldehyde sulfoxylate aqueous solution were added intermittently in 5 times at an interval of 30 min.

Then, the following monomers and polymerization aids were added to effect 6 hours of second-stage graft polymerization at 60° C.

| | |
|---|---|
| Styrene | 11.25 wt. part(s) |
| Acrylonitrile | 3.50 wt. part(s) |
| Methyl methacrylate | 0.25 wt. part(s) |
| t-Butyl hydroperoxide aqueous solution (5%) | 1.0 wt. part(s) |
| Sodium formaldehyde sulfoxylate aqueous solution (5%) | 1.0 wt. part(s) |

Similarly, the t-butyl hydroperoxide aqueous solution and sodium formaldehyde sulfoxylate aqueous solution were added intermittently in 5 times at an interval of 30 min.

Further, at 4 hours after the commencement of the second stage-graft polymerization, the following polymerization aids were added.

| | |
|---|---|
| t-Butyl hydroperoxide aqueous solution (5%) | 0.5 wt. part(s) |
| Sodium formaldehyde sulfoxylate aqueous solution (5%) | 0.5 wt. part(s) |

The resultant graft copolymer latex showed an average particle size of 220 nm.

An antioxidant emulsion was added to the resultant latex, followed by salt precipitation with calcium chloride aqueous solution, de-watering, washing with water and drying, to obtain a powdery graft copolymer.

The rubber polymer component in the graft copolymer showed a glass transition temperature of −26° C., and the graft copolymer showed a refractive index $n_D$ at 23° C. of 1.569 in its sheet form.

20 wt. parts of the thus obtained graft copolymer was blended with 80 wt. parts of a styreneacrylonitrile copolymer resin ("Cebian N−050" (trade name), available from Daicel Kagaku K.K.), and the resultant mixture was kneaded for 3 min. on rollers having a surface temperature of 160° C. The obtained milled sheet was preheated for 5 min. and then molded under a load of 70 kg/cm² for 5 min. by means of a hot press having a hot plate temperature of 180° C. to be shaped into a 3 mm-thick plate product. A test piece measuring 50 mm-long and 50 mm-wide was cut out from the plate product and subjected to measurement of a parallel light transmittance and a haze value. Further, a No. 5 test specimen (with a V-notch) according to JIS K-7111 (1984) was cut out from the plate product and subjected to a Charpy impact test at 23° C.

COMPARATIVE EXAMPLE 7

A rubber polymer was prepared by emulsion polymerization in the same manner as in Example 20 except that 39.2 wt. parts of styrene was used instead of the 3-isopropenylbiphenyl and the amount of 1,3-butadiene was changed to 30.8 wt. parts.

The resultant rubber polymer showed an average particle size of 210 nm in its latex form and a refractive index $n_D^{23}$ of 1.568 in its sheet form.

The rubber polymer latex obtained above was subjected to two stages of graft polymerization in the same manner as in Example 20.

The resultant graft copolymer showed an average particle size of 230 nm in its latex form and a refractive index $n_D^{23}$ of 1.569 in its sheet form. The rubber polymer component in the graft copolymer showed a glass transition temperature of +4° C.

In this way, a graft copolymer having refractive indexes of its rubber component and itself which were identical to those of the graft copolymer in Example 20, was obtained in a powdery form.

20 wt. parts of the thus obtained graft copolymer was blended with 80 wt. parts of the same acrylonitrile-styrene copolymer resin as used in Example 20 to prepare a 3 mm-thick plate product, which was similarly subjected to evaluation of impact resistance and transparency as in Example 20.

The compositions of the rubber polymers and graft copolymers prepared in Example 20 and Comparative Example 7 are shown in Table 5, and the properties thereof and of molded samples from the graft copolymers are shown in Table 6.

In Table 6, the properties of a molded sample prepared from the commercially available styreneacrylonitrile copolymer alone are also shown for reference.

From the comparison of Example 20 and Comparative Example 7, the graft copolymer containing 3-isopropenylbiphenyl in its rubber polymer component according to the present invention (Example 20) provided a much better impact resistance-improving effect than the corresponding graft copolymer using styrene in its rubber polymer component (Comparative Example 7) with respect to styrene-acrylonitrile copolymer resin while retaining a good transparency level.

As described hereinabove, the graft copolymer according to the present invention is characterized by its high refractive index as well as a low glass transition temperature of its rubber component. Accordingly, the graft copolymer is suitable for use as an impact resistance modifier to provide a thermoplastic resin composition with excellent transparency by mixing with various thermoplastic resins inclusive of vinyl chloride resin and styreneacrylonitrile copolymer resin. Further, the graft copolymer is also useful as a transparent thermoplastic resin with excellent impact resistance suitable for various purposes.

TABLE 1

Composition of Graft Copolymer

| | | Rubber polymer components** (wt. parts) | | | | 1st graft components** (wt. parts) | | | | 2nd graft components** (wt. parts) | | |
|---|---|---|---|---|---|---|---|---|---|---|---|---|
| | | BD | comonomer | | DVB | t-DM | MMA | BA | ST | 3-IPB | MMA | ST | 3-IPB |
| Ex. | 1 | 65.25 | 4-IPB | 9.75 | 0.262 | — | 10.5 | 2.0 | — | — | — | 12.5 | — |
| | 2 | 60.0 | 4-IPB | 15.0 | 0.262 | — | 10.5 | 2.0 | — | — | — | 12.5 | — |
| | 3 | 56.25 | 4-IPB | 18.75 | 0.262 | — | 10.5 | 2.0 | — | — | — | 12.5 | — |
| | 4 | 52.5 | 4-IPB | 22.5 | 0.262 | — | 10.5 | 2.0 | — | — | — | 12.5 | — |
| | 5 | 45.0 | 4-IPB | 30.0 | 0.262 | — | 10.5 | 2.0 | — | — | — | 12.5 | — |
| | 6 | 45.0 | 4-IPB | 30.0 | 0.262 | — | 6.25 | — | — | 6.25 | 6.25 | — | 6.25 |
| | 7 | 64.5 | 4-IPB | 10.5 | — | — | 10.5 | 2.0 | — | — | — | 12.5 | — |
| | 8 | 65.25 | 4-IPB | 9.75 | — | — | 10.5 | 2.0 | — | — | — | 12.5 | — |
| | 9 | 64.5 | 3-IPB | 10.5 | — | — | 10.5 | 2.0 | — | — | — | 12.5 | — |
| | 10 | 53.3 | 3-IPB | 11.7 | — | 0.2 | 10.5 | — | 5.0 | 2.0 | 10.5 | 5.0 | 2.0 |
| | 11 | 65.25 | 2-IPN | 9.75 | — | — | 10.5 | 2.0 | — | — | — | 12.5 | — |
| | 12 | 63.75 | 4-VB | 11.25 | 0.262 | — | 10.5 | 2.0 | — | — | — | 12.5 | — |
| | 13 | 63.75 | 2-VN | 11.25 | 0.262 | — | 10.5 | 2.0 | — | — | — | 12.5 | — |
| | 14 | 64.0 | 4-IPB 7.0 ST | 4.0 | — | — | 10.5 | 2.0 | — | — | — | 12.5 | — |
| | 15 | 62.0 | 4-IPB 6.5 3-IPB | 6.5 | — | — | 10.5 | 2.0 | — | — | — | 12.5 | — |
| Comp. Ex. | 1 | 56.5 | ST | 18.5 | 0.262 | — | 10.5 | 2.0 | — | — | — | 12.5 | — |
| | 2 | 57.75 | ST | 17.25 | 0.262 | — | 10.5 | 2.0 | — | — | — | 12.5 | — |
| | 3 | 45.0 | ST | 30.0 | 0.262 | — | 10.5 | 2.0 | — | — | — | 12.5 | — |
| | 4 | 37.5 | ST | 37.5 | 0.262 | — | 10.5 | 2.0 | — | — | — | 12.5 | — |
| | 5 | 49.4 | ST | 15.6 | — | 0.2 | 10.5 | — | 5.0 | 2.0 | 10.5 | 5.0 | 2.0 |

**The respective monomer components are represented by their abbreviations as shown in the following page.
Abbreviations in Table 1
1) BD: 1,3-butadiene
2) 4-IPB: 4-isopropenylbiphenyl
3) 3-IPB: 3-isopropenylbiphenyl
4) 2-IPN: 2-isopropenylnaphthalene
5) 4-VB: 4-vinylbiphenyl
6) 2-VN: 2-vinylnaphthalene
7) ST: styrene
8) DVB: divinylbenzene
9) t-DM: tertiary-dodecyl mercaptan
10) MMA: methyl methacrylate
11) BA: butyl acrylate

TABLE 2A

Properties of Graft Copolymer

| | | Refractive index ($n_D^{23}$) | | $T_g$ (°C.)[2] | Average particle size (nm) | | Graft rate (%) | Graft efficiency (%) |
|---|---|---|---|---|---|---|---|---|
| | | R.P.[1] | G.C.[1] | R.P. | R.P. | G.C. | | |
| Ex. | 1 | 1.5372 | 1.5402 | −53 | 160 | 170 | 31.1 | 93.2 |
| | 2 | 1.5467 | 1.5472 | −41 | 130 | 140 | 31.1 | 93.3 |
| | 3 | 1.5537 | 1.5518 | −35 | 130 | 140 | | |
| | 4 | 1.5598 | 1.5555 | −29 | 140 | 150 | 31.0 | 93.0 |
| | 5 | 1.5762 | 1.5670 | −2 | 150 | 160 | | |
| | 6 | 1.5762 | 1.5721 | −12 | 150 | 160 | | |
| | 7 | 1.5366 | 1.5389 | −52 | 170 | 180 | | |
| | 8 | 1.5361 | 1.5388 | −52 | 100 (190)[3] | 210 | | |
| | 9 | 1.5371 | 1.5392 | −51 | 110 | 120 | 29.7 | 89.2 |
| | 10 | 1.5403 | 1.5416 | −55 | 300 | 350 | | |
| | 11 | 1.5384 | 1.5400 | −49 | 120 | 130 | | |
| | 12 | 1.5367 | 1.5386 | −57 | 110 | 120 | | |
| | 13 | 1.5370 | 1.5401 | −56 | 120 | 130 | | |
| | 14 | 1.5361 | 1.5377 | −53 | 130 | 140 | | |
| | 15 | 1.5362 | 1.5388 | −51 | 120 | 130 | | |
| Comp. Ex. | 1 | 1.5350 | 1.5397 | −42 | 170 | 185 | | |
| | 2 | 1.5340 | 1.5384 | −48 | 110 | 120 | | |
| | 3 | 1.5505 | 1.5482 | −23 | 100 | 110 | | |
| | 4 | 1.5599 | 1.5547 | −8 | 90 | 100 | | |
| | 5 | 1.5394 | 1.5406 | −44 | 260 | 320 | | |

[1] R.P.: rubber polymer
G.C.: graft polymer
[2] Tg: glass transition temperature
[3] The value in the parentheses represents the average particle size after size enlargement by coagulation.

TABLE 2B

Properties of Polyvinyl Chloride Composition

| | | Charpy impact strength** (kg · cm/cm²) | | | | Transparency Formulation A | |
|---|---|---|---|---|---|---|---|
| | | Formulation A[1] | | Formulation B[2] | | | |
| | | 23° C. | 10° C. | 23° C. | 10° C. | Tp (%) | H (%) |
| Ex. | 1 | 142 (100%) | 49 (20%) | | | 85.8 | 2.3 |
| | 7 | 119 (100%) | 46 (20%) | | | 84.5 | 2.6 |
| | 8 | 145 (100%) | 123 (100%) | | | 81.8 | 3.8 |
| | 9 | | | 116 (100%) | 100 (100%) | 85.2 | 1.9 |

TABLE 2B-continued

| | Properties of Polyvinyl Chloride Composition | | | | | |
|---|---|---|---|---|---|---|
| | Charpy impact strength** (kg · cm/cm²) | | | | Transparency | |
| | Formulation A[1] | | Formulation B[2] | | Formulation A | |
| | 23° C. | 10° C. | 23° C. | 10° C. | Tp (%) | H (%) |
| 11 | | | 125 (100%) | 107 (100%) | 86.1 | 2.2 |
| 12 | | | 72 (100%) | 71 (100%) | 83.5 | 2.6 |
| 13 | | | 72 (100%) | 71 (100%) | 84.6 | 2.5 |
| 14 | | | 109 (100%) | | 82.3 | 3.5 |
| 15 | | | 126 (100%) | | 85.0 | 2.6 |
| Comp. Ex. 1 | 109 (100%) | 20 (0%) | | | 84.2 | 2.6 |
| 2 | | | 49 (60%) | 39 (40%) | 83.0 | 2.8 |

**The values in the parentheses represent the ductile breakage percent.
[1]Formulation A contained 10 wt. parts of the graft copolymer.
[2]Formulation B contained 12 wt. parts of the graft copolymer.

TABLE 3

| | Rubber polymer components** (wt. parts) | | | | 1st graft component** (wt. parts) | | | 2nd graft component** (wt. parts) | | |
|---|---|---|---|---|---|---|---|---|---|---|
| | BD | 4-IPB | 3-IPB | ST | MMA | AN | ST | MMA | AN | ST |
| Ex. 16 | 65.25 | 9.75 | — | — | 12.5 | — | 12.5 | — | — | — |
| 17 | 65.25 | 9.75 | — | — | — | 5.0 | 7.5 | — | 5.0 | 7.5 |
| 18 | 69.6 | 10.4 | — | — | — | 8.0 | 12.0 | — | — | — |
| 19 | 13.0 | — | 7.0 | — | — | 23.0 | 57.0 | — | — | — |
| Comp. Ex. 6 | 9.0 | — | — | 11.0 | — | 23.0 | 57.0 | — | — | — |

**The abbreviations representing the monomers have the same meaning as in Table 1.

TABLE 4

| | Properties of graft copolymer | | | | | Properties of shaped samples | | | |
|---|---|---|---|---|---|---|---|---|---|
| | Refractive index ($n_D^{23}$) | | Tg (°C.) | Average particle size (nm) | | Charpy impact strength (kg · cm/cm²) | | Transparency | |
| | R.P. | G.C. | R.P. | R.P. | G.C. | No. 5 test specimen (23° C.) | No. 1 E.D. test specimen (0° C.) | Tp (%) | H (%) |
| Ex. 16 | 1.5371 | 1.5392 | −52 | 110 | 120 | — | — | — | — |
| 17 | 1.5369 | 1.5421 | −54 | 110 | 120 | — | — | — | — |
| 18 | 1.5366 | 1.5409 | −55 | 120 | 130 | — | — | — | — |
| 19 | 1.5650 | 1.5649 | −25 | 210 | 350 | 5.6 | not broken | 71.5 | 4.5 |
| Comp. Ex. 6 | 1.5667 | 1.5662 | +3 | 200 | 330 | 2.1 | 21.1 (broken) | 72.2 | 3.6 |

TABLE 5

| | Rubber polymer components** (wt. parts) | | | 1st graft components** (wt. parts) | | | 2nd graft component** (wt. parts) | | |
|---|---|---|---|---|---|---|---|---|---|
| | BD | 3-IPB | ST | MMA | AN | ST | MMA | AN | ST |
| Ex. 20 | 42.0 | 28.0 | — | — | 3.75 | 11.25 | 0.25 | 3.50 | 11.25 |
| Comp. Ex. 7 | 30.8 | — | 39.2 | — | 3.75 | 11.25 | 0.25 | 3.50 | 11.25 |

**The abbreviations representing the monomers have the same meanings as in Table 1.

TABLE 6

| | Properties of graft copolymer | | | | | Properties of shaped samples | | |
|---|---|---|---|---|---|---|---|---|
| | Refractive index ($n_D^{23}$) | | Tg (°C.) | Average particle size (nm) | | Charpy impact strength (kg · cm/cm²) | Transparency | |
| | R.P. | G.C. | R.P. | R.P. | G.C. | | Tp (%) | H (%) |
| Ex. 20 | 1.568 | 1.569 | −26 | 200 | 220 | 3.0 | 81.1 | 2.9 |
| Comp. Ex. 7 | 1.568 | 1.569 | +4 | 210 | 230 | 1.1 | 77.3 | 7.2 |
| No graft copolymer added | | | | | | 1.1 | 85.1 | 3.6 |

What is claimed is:
1. A graft copolymer, comprising: 5–90 wt. parts of a rubber polymer and 10–95 wt. Parts of a vinyl monomer graft-polymerized onto the rubber polymer; said rubber polymer comprising 40–99 wt. % of butadiene and 1–60 wt. % of an aromatic polycyclic vinyl monomer represented by the following formula (I) or (II):

Formula (I)

-continued

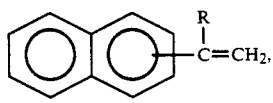
Formula (II)

wherein R denotes a hydrogen atom or a methyl group.

2. A graft copolymer according to claim 1, wherein said rubber polymer shows a refractive index $n^{23}$ of 1.52 to 1.60 at 23° C., and a glass transition temperature of −70° C. to +10° C.

3. A graft copolymer according to claim 1, wherein said vinyl monomer comprising at least one member selected from the group consisting of alkyl methacrylates, alkyl acrylates, aromatic vinyl compounds, vinyl cyanides and mixtures of these monomers with other vinyl monomers copolymerizable therewith.

4. A graft copolymer according to claim 1, wherein said vinyl monomer comprises at least one member selected from the group consisting of methyl methacrylate, styrene, acrylonitrile and butyl acrylate.

5. A graft copolymer according to claim 1, wherein said vinyl monomer comprises an aromatic polycyclic vinyl monomer represented by the formula (I) or (II).

6. A graft copolymer according to claim 1, wherein said aromatic polycyclic vinyl monomer represented by the formula (I) comprises at least one of 4-isopropenylbiphenyl and 3-isopropenylbiphenyl.

7. A graft copolymer according to claim 1, wherein said aromatic polycyclic vinyl monomer represented by the formula (II) comprises 2-isopropenylnaphthalene.

8. A graft copolymer according to claim 1, which has been obtained by graft polymerization of the vinyl monomer in the presence of the rubber polymer in its latex form having an average particle size of 50–800 nm.

9. A graft copolymer according to claim 1, which has a graft ratio of 5–55%.

10. A graft copolymer according to claim 1, wherein 15–50 wt. parts of the vinyl monomer is graft-polymerized onto 50–85 wt. parts of the rubber polymer.

11. A graft copolymer according to claim 1, wherein 50–95 wt. parts of the vinyl monomer is graft-polymerized onto 5–50 wt. parts of the rubber polymer.

12. A thermoplastic resin composition comprising a mixture of a thermoplastic resin and a graft copolymer according to claim 1.

13. A thermoplastic resin composition according to claim 12, which comprises 50–98 wt. parts of the thermoplastic resin and 2–50 wt. parts of the graft copolymer.

14. A thermoplastic resin composition according to claim 12, wherein said graft copolymer comprises 50–85 wt. parts of the rubber polymer and 15–50 wt. parts of the vinyl monomer graft-polymerized onto the rubber polymer.

15. A thermoplastic resin composition according to of claim 12, wherein the thermoplastic resin comprises a vinyl chloride resin.

16. A thermoplastic resin composition according to claim 12, wherein the thermoplastic resin comprises a styrene-acrylonitrile copolymer resin.

* * * * *